US007058466B2

(12) United States Patent
Manuel et al.

(10) Patent No.: US 7,058,466 B2
(45) Date of Patent: Jun. 6, 2006

(54) METHOD AND APPARATUS FOR THE CREATION OF A TOOL

(76) Inventors: Mark Manuel, 14377 Knightsbridge, Shelby Township, MI (US) 48315; Christopher Dean Kirkum, 106 Belleview, Mt. Clemens, MI (US) 48043; Robert Racklyeft, 19205 Casecade Dr., Brownstone, MI (US) 48192

( * ) Notice: Subject to any disclaimer, the term of this patent is extended or adjusted under 35 U.S.C. 154(b) by 0 days.

(21) Appl. No.: 10/440,454

(22) Filed: May 16, 2003

(65) Prior Publication Data

US 2005/0038539 A1    Feb. 17, 2005

Related U.S. Application Data

(63) Continuation of application No. 09/741,928, filed on Dec. 20, 2000, now Pat. No. 6,587,742.

(51) Int. Cl.
*G06F 19/00* (2006.01)
(52) U.S. Cl. ............... 700/98; 700/118; 700/119; 700/182
(58) Field of Classification Search ............ 700/98, 700/118, 119, 182
See application file for complete search history.

(56) References Cited

U.S. PATENT DOCUMENTS

| | | |
|---|---|---|
| 1,539,887 A | 6/1925 | Vandergrift |
| 3,416,766 A | 12/1968 | Miller |
| 4,141,531 A | 2/1979 | Stausfeld |
| 4,474,722 A | 10/1984 | Martin |
| 4,702,969 A | 10/1987 | Bunkoczy |
| 4,746,055 A | 5/1988 | Ingram |
| 4,810,591 A | 3/1989 | Sakai |
| 4,867,412 A | 9/1989 | Greune |
| 4,946,552 A | 8/1990 | Onnie |
| 4,997,602 A | 3/1991 | Trimble |
| 5,031,483 A * | 7/1991 | Weaver ............... 76/107.1 |
| 5,032,469 A | 7/1991 | Merz |
| 5,079,102 A | 1/1992 | Tanaka |
| 5,106,290 A | 4/1992 | Carver et al. |
| 5,151,167 A | 9/1992 | Truong |
| 5,156,322 A | 10/1992 | Thoi |
| 5,247,861 A | 9/1993 | Jahn |
| 5,256,496 A | 10/1993 | Kluczynski |
| 5,273,803 A | 12/1993 | Metcalf |

(Continued)

FOREIGN PATENT DOCUMENTS

DE    3711470 A1    10/1988

(Continued)

OTHER PUBLICATIONS

A New Rapid Tooling Method For Sheet Metal Forming Dies Inventor :Daniel Walczyk.

(Continued)

*Primary Examiner*—Leo Picard
*Assistant Examiner*—Alexander Kosowski
(74) *Attorney, Agent, or Firm*—Law Offices of John Chupa & Associates, P.C.

(57) ABSTRACT

An apparatus 10 and a method 50 for the creation of a tool 40. The apparatus 10 and the method 50 allow for dynamic measurement of the tool 40 as it is being created and further allows for the use of positive feedback to increase the likelihood that the produced tool will be structurally similar to a certain model. The apparatus 10 and method 50 further allow sections of varying thicknesses to be used and provide a technique to create surfaces which further increase the likelihood that the produced tool will be structurally equivalent to a desired and modeled tool.

4 Claims, 3 Drawing Sheets

U.S. PATENT DOCUMENTS

| | | |
|---|---|---|
| 5,330,343 A | 7/1994 | Berteau |
| 5,345,052 A | 9/1994 | Puddephatt |
| 5,347,423 A | 9/1994 | deNeuf |
| 5,377,116 A | 12/1994 | Wayne et al. |
| 5,399,239 A | 3/1995 | Pai |
| 5,400,946 A | 3/1995 | Weise |
| 5,421,544 A | 6/1995 | Roop |
| 5,439,622 A | 8/1995 | Pennisi et al. |
| 5,462,263 A | 10/1995 | Feltrin |
| 5,529,805 A | 6/1996 | Iacovangelo |
| 5,641,448 A | 6/1997 | Yeung |
| 5,779,833 A | 7/1998 | Cawley et al. |
| 5,792,492 A | 8/1998 | Takahashi |
| 5,793,015 A | 8/1998 | Walczyk |
| 5,830,585 A | 11/1998 | Hosoe |
| 5,847,958 A * | 12/1998 | Shaikh et al. ............... 700/119 |
| 5,869,353 A | 2/1999 | Levy |
| 5,878,619 A | 3/1999 | Walczak |
| 5,948,548 A | 9/1999 | Welty |
| 6,024,851 A | 2/2000 | Radhakrishnan |
| 6,025,036 A | 2/2000 | McGill |
| 6,038,525 A | 3/2000 | Maguire |
| 6,060,392 A | 5/2000 | Essaian |
| 6,063,436 A | 5/2000 | Pavell |
| 6,081,328 A | 6/2000 | Eng |
| 6,090,207 A | 7/2000 | Knauss |
| 6,090,507 A | 7/2000 | Grenon |
| 6,103,402 A | 8/2000 | Marcin, Jr. |
| 6,109,332 A | 8/2000 | Sachs |
| 6,113,752 A | 9/2000 | Hollstein |
| H1933 H | 1/2001 | Zabinski |
| 6,355,331 B1 | 3/2002 | Hillier |
| 6,391,473 B1 | 5/2002 | Numakura |
| 6,401,001 B1 * | 6/2002 | Jang et al. ................... 700/118 |
| 6,472,029 B1 | 10/2002 | Skszek |
| 6,495,272 B1 | 12/2002 | Creber |
| 6,627,835 B1 | 9/2003 | Chung |
| 2002/0175265 A1 | 11/2002 | Bak |
| 2004/0128016 A1 | 7/2004 | Stewart |

FOREIGN PATENT DOCUMENTS

| | | |
|---|---|---|
| EP | 0775 550 A1 | 5/1997 |
| EP | 1216 806 A2 | 6/2002 |
| GB | 38370/73 | 8/1973 |
| JP | 58-091123 | 5/1983 |
| WO | WO 8707538 | 12/1987 |
| WO | WO 88/07932 | 10/1988 |
| WO | PCT/US94/10404 | 9/1994 |
| WO | WO 01/70450 A1 | 9/2001 |
| WO | WO 03/043795 | 5/2003 |
| WO | WO 03043795 | 5/2003 |
| WO | WO-A-9508416 | 8/2004 |

OTHER PUBLICATIONS

XP-000803370, Walczyk, Nov. 1998.

* cited by examiner

METHOD AND APPARATUS FOR THE CREATION OF A TOOL

This application is a continuation of application(s) non-provisional application No. 09/741,928 filed on Dec. 20, 2000, now U.S. Pat. No. 6,587,742.

FIELD OF THE INVENTION

The present invention generally relates to a method and an apparatus for the creation of a tool and more particularly, to a method and an apparatus for selectively and efficiently creating a tool by the use of a mathematical and/or computer generated model of the tool and the creation of sections which are later operatively bound, thereby co-operatively forming the tool.

BACKGROUND OF THE INVENTION

A tool, such as a mold, die, or other multi-dimensional object, is commonly used to selectively produce relatively large amounts of substantially identical objects. The tool may also be formed into several portions or parts which cooperatively produce these objects.

Traditionally, such a tool is produced by the use of a substantially solid block of material which is "shaped" (e.g., by cutting and/or grinding) into a desired form. Several blocks may be needed for certain tools having various parts or portions. This method, although capable of producing the desired tool, is relatively costly, is highly inefficient, and is not capable of rapidly producing a tool to meet the demands of the tooling industry.

In order to reduce the cost and expense associated with the production of the tool in the previously delineated manner and in order to allow a tool to be "rapidly" produced, a "laminar process" or method is alternatively employed. Such a laminar technique requires the initial creation of a multi-dimensional mathematical or "computer based" tool model. The model is then partitioned in order to create various tool or model "partitions." These intangible partitions are then used to form and are physically manifested within sections of material which are then sequentially stacked and bonded to cooperatively form a structure which approximates the structure of the desired tool. While this laminar technique does reduce overall production costs and does allow a tool to be rapidly produced, it does not reliably produce a structure which has a form which is substantially similar to that of the desired tool.

That is, the laminar process fails to account for variances in the material used to form the sections, the spacing between sections caused by the bonding material, as well as various other variances. The laminar process also fails to determine, as the process proceeds, how well the incompletely or partially formed structure approximates the portion of the tool to which it corresponds and fails to allow for dynamic modification of the process to correct and/or to operatively "counteract" irregularities and/or structural faults.

Hence, oftentimes a structure is produced which does not readily approximate the tool, thereby undesirably increasing the cost and expense associated with the formation of the tool since the resultant structure must either be discarded or "reworked". Moreover, the laminar process also utilizes substantially identical partition and sectional widths which prevent the use of relatively wide sections to create portions of the tool having a substantially constant width, thereby reducing the number of needed and/or utilized sections and significantly reducing overall production cost and expense. The laminar process also does not account for height variances within a single tool partition, oftentimes eliminating important structural aspects of the tool from the produced structure, and is not readily adapted for use in a completely and/or substantially completely automated environment due to its failure to provide dynamic feedback signals representing the accuracy of the overall tool building process.

There is therefore a need for a new and improved process for quickly and efficiently producing a tool and which overcomes some or all of the previously delineated drawbacks of prior tool producing methods and processes, and there is therefore a need for an apparatus to perform this new and improved process. Applicants' invention addresses these needs and represents such a new and improved tool forming process and apparatus.

SUMMARY OF THE INVENTION

It is a first non-limiting advantage of the present invention to provide a method and apparatus for the creation of a tool which overcomes some or all of the previously delineated drawbacks of prior tool forming methods and apparatuses.

It is a second non-limiting advantage of the present invention to provide a method and an apparatus for the creation of a tool which overcomes some or all of the previously delineated drawbacks of prior tool forming methods and apparatuses and which dynamically and substantially ensures that the produced structure desirably approximates the corresponding structure of the tool by the use of positive feedback signals which are based on certain thickness measurements.

It is a third non-limiting advantage of the present invention to provide a method and an apparatus for the creation of a tool which overcomes some or all of the previously delineated drawbacks of prior methods and apparatuses and which allows sections of varying widths to be selectively and dynamically created, thereby reducing the overall tool production cost and expense.

It is a fourth non-limiting advantage of the present invention to provide a method and an apparatus for the creation of a tool which overcomes some or all of the previously delineated drawbacks of prior methods and apparatuses and which utilizes the height of each end of a partition of the model to create a section which may be used to create a relatively cost effective tool structure which more closely approximates that partition then current techniques, thereby allowing a tool to be selectively, efficiently, and accurately produced.

According to a first aspect of the present invention, a method for creating a tool is provided. The method includes the steps of creating a model of the tool; creating a first partition of the model; creating a first section from the first partition; measuring the section; using the measurement to create a second partition of the model; creating a second section from the second partition; and attaching the second section to the first section, thereby forming a tool.

According to a second aspect of the present invention, a method for creating a tool is provided. The method includes the steps of creating a model of the tool; creating a first partition of the model; creating a first section having a first width by use of the first partition of the model; creating a second partition of the model; creating a second section having a second width by use of the second partition of the model; and attaching the second section to the first section, thereby forming the tool.

According to a third aspect of the present invention, a method for forming a tool is provided. The method includes the steps of creating a model of the tool; creating a plurality of partitions from the model, each of the plurality of partitions having respective first and second ends of a certain respective height; and creating a section for each of the plurality of partitions, each section having first and second ends and each of the first and second ends having a substantially similar and respective height which is equal to the height of the first end of the partition to which that section pertains only when the height of the first end of the partition to which that section pertains is larger than or equal to the height of the second end of the partition to which that section pertains, and wherein each section has a surface which resides between the respective first and second ends.

According to a fourth aspect of the present invention, an apparatus is provided which selectively forms a tool. The apparatus includes a tool model forming portion; a press which is coupled to the tool model forming portion; a section forming portion which is coupled to the tool model forming portion and to the press and which forms sections by use of the tool model and which selectively stacks the formed sections within the press; and a measurement portion which measures the thickness of the stacked sections and which generates a signal, based on the thickness measurement, and which communicates the signal to the model forming portion.

These and other features, aspects, and advantages of the present invention will become apparent by a review of the following detailed description of the preferred embodiment of the invention and by reference to the following drawings.

DETAILED DESCRIPTION OF THE PREFERRED EMBODIMENT OF THE INVENTION

Figure 2:
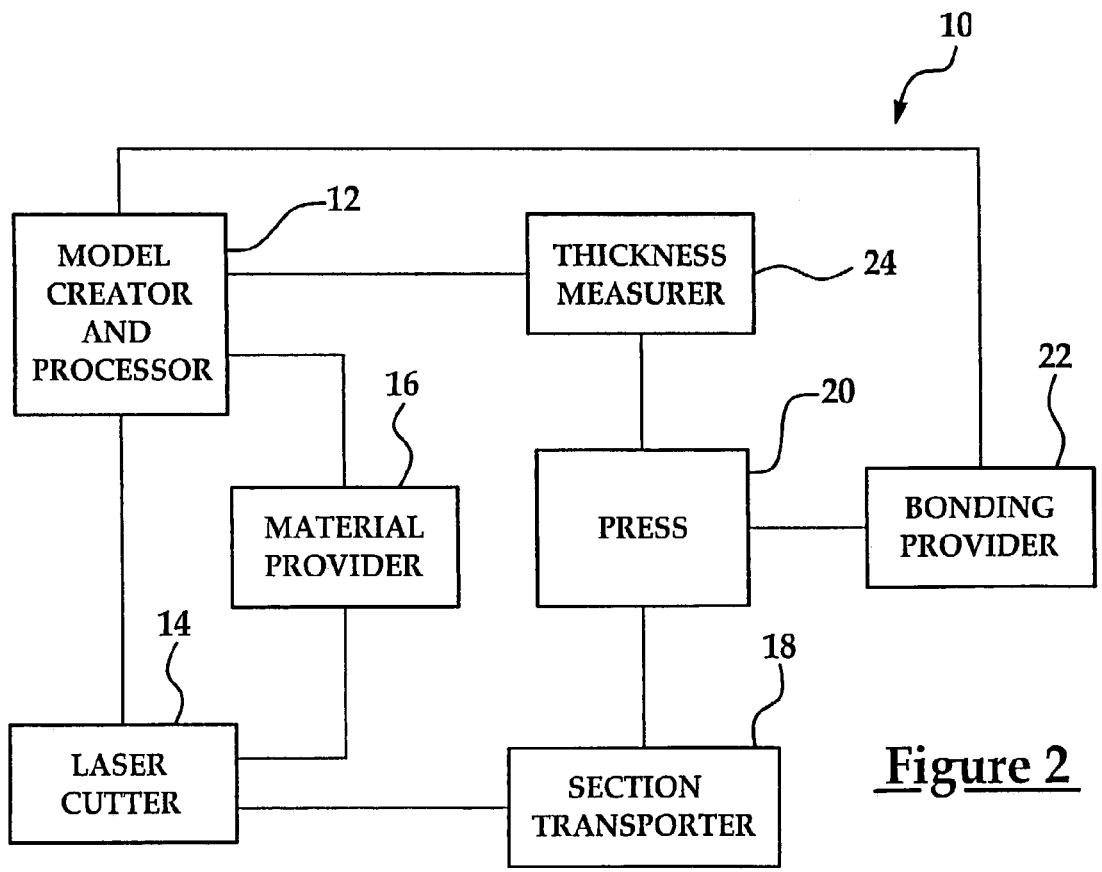
FIG. 2 is block diagram of a tool creation and/or forming apparatus which is made in accordance with the teachings of the preferred embodiment of the invention and which may be used to create the tool which is shown in FIG. 1.
Figure 3:
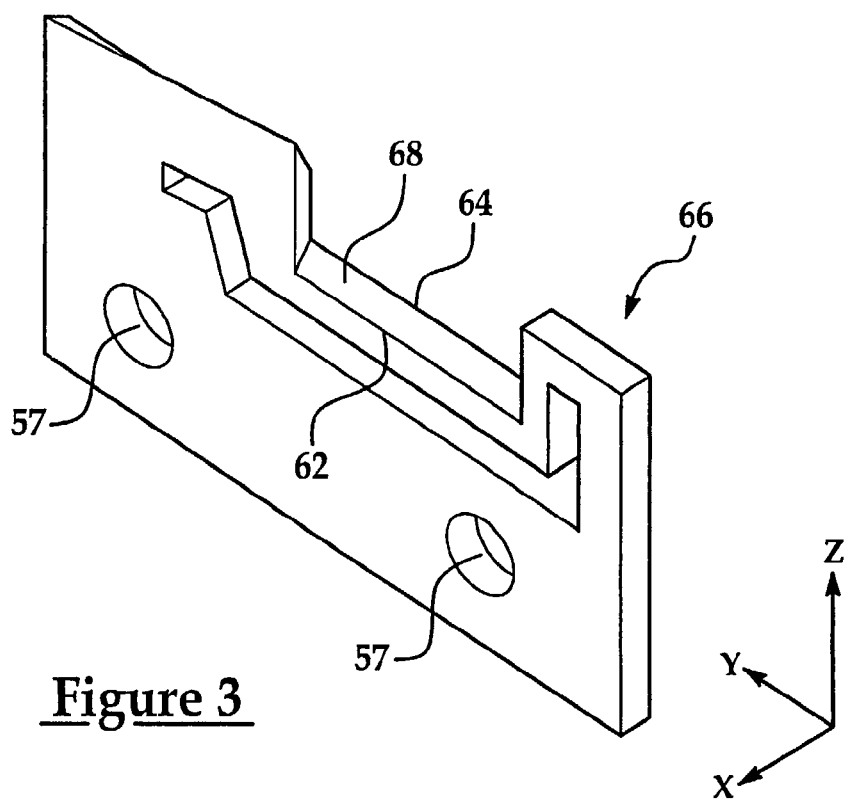
FIG. 3 is a perspective view of a section which is created by the use of the tool partition which is shown in FIG. 1 and by the tool creation apparatus which is shown in FIG. 2.
Figure 4:
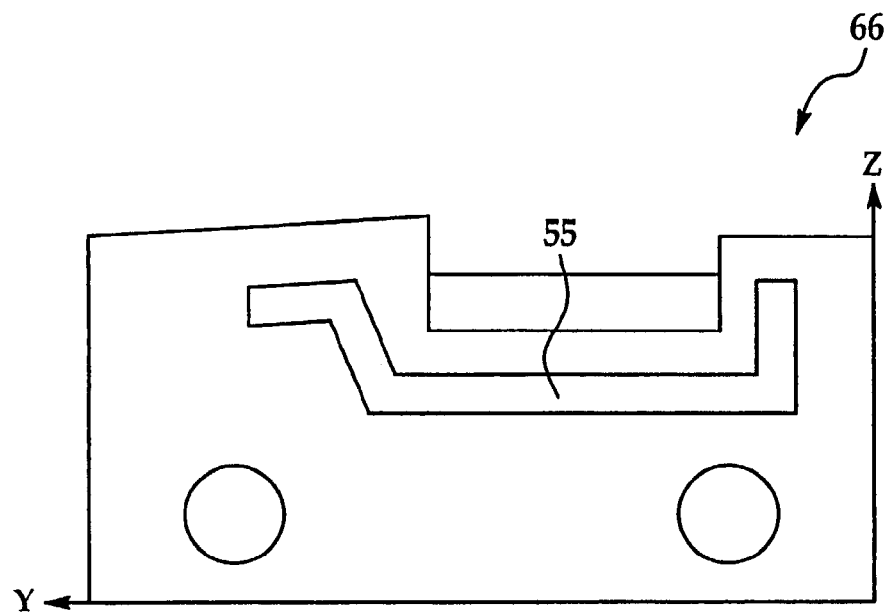
FIG. 4 is a side view of the section which is shown in FIG. 3.

Referring now to FIG. 2, there is shown a tool creation and/or forming apparatus 10 which is made in accordance with the teachings of the preferred embodiment of the invention. As shown, tool creation apparatus 10 includes a computer or processor 12 which is operable under stored program control and which selectively creates and/or receives a computer aided design or a substantially "similar type of model" or intangible manifestation of a tool which is to be created. Such a model typically has a three dimensional data format, including but not limited to data which specifies the surface features and contours necessary to allow the formed tool to produce a desired part or product. In one non-limiting embodiment, computer or processor 12 comprises a commercially available computer, and the created and/or received model may form a three dimensional and relatively accurate picture of the tool.

Tool creation apparatus 10 further includes a laser cutter 14 which is controllably and communicatively coupled to the model creator and processor 12 and a material provider 16 which is communicatively and controllably coupled to the laser cutter 14 and to the model creator and processor 12. In one-non limiting embodiment of the invention, material provider 16 provides and transports sheets of material having a certain desired and/or specified thickness and height to the laser cutter 14. Hence, in this non-limiting embodiment of the invention, section provider 16 comprises a store of sheets of material and a placement and transport apparatus (e.g., a robot and/or conveyor assembly) which, upon receipt of commands from the model creator and processor 12, automatically places a sheet of material in operative close proximity to the laser cutter 14.

Apparatus 10 further includes a section transporter 18 and a press 20. Particularly, section transporter 18 is controllably and communicatively coupled to the laser cutter 14 and to the press 20 and, in one non-limiting embodiment of the invention, comprises a robot and/or conveyor assembly and is effective to selectively transport sections, which are formed by the laser cutter 14 from the material provided by the material provider 16, to the press 20. Transporter 18 (as well as the transport functionality of provider 16) may be replaced by human workers or some other commercially available machinery. Hence, laser cutter 14, material provider 16, and section transporter 18 cooperatively comprise, in one non-limiting embodiment, a "section forming" assembly. Cutter 14 may also comprise some other type of conventional and commercially available apparatus.

Apparatus 10 further includes a bonding provider 22 which is communicatively and controllably coupled to the model creator and processor 12 and to the press 20, and a thickness measurement apparatus 24 which is operatively and communicatively coupled to the press 20 and to the model creator and processor 12.

Particularly, bonding provider 22 comprises a store and/or quantity of bonding material and an application portion or apparatus (e.g., a robot) which is adapted to selectively apply the bonding material to the various sections which are received by and/or within the press 20, upon the receipt of certain command signals from the model creator and processor 12. Thickness measurement device 24 is adapted to, upon the receipt of certain command signals from the model creator and processor 12, measure the thickness of the various sections which are resident within the press 20 and to communicate such measurements to the model creator and processor 12. The press 20 is adapted to selectively apply pressure to or "pressurize" the various sections which it receives and cooperates with the bonding material to cause the contained sections to cooperatively form a desired tool. In one non-limiting embodiment of the invention, boding provider 22 is not used. Rather, the sections are selectively "joined" or "bonded" only by press 20. Thickness measurer may comprise a commercially available laser or light measurement system or some other conventional device.

Figure 1:
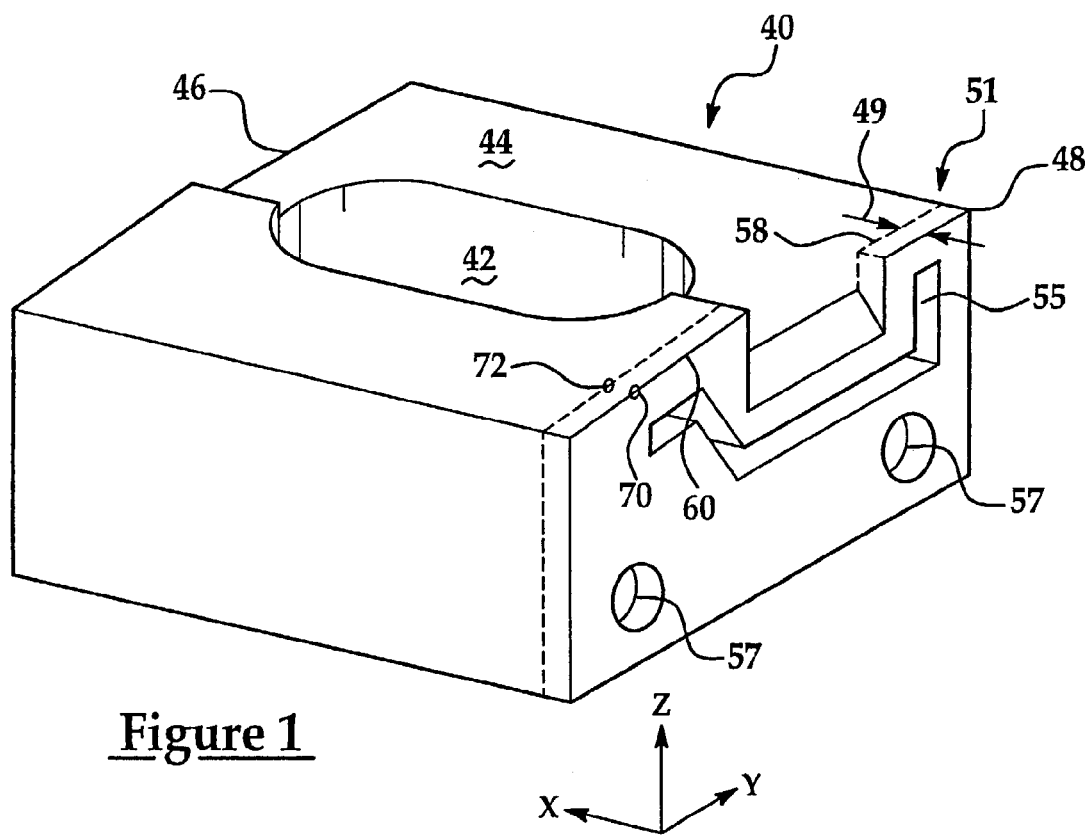
FIG. 1 is an exploded perspective view of a tool which is made in accordance with the teachings of the preferred embodiment of the invention and further illustrating a partition of the tool which is used to form a section in the tool formation process of the preferred embodiment of the invention.

The operation of the tool creation apparatus 10 will now be further explained with reference to the tool 40 which is shown in FIG. 1 and which comprises a structure having a cavity 42 and at least one "rolling" or substantially uneven surface 44. The following explanation will further utilize the conventional "x", "y", and "z" coordinate system which is also shown in FIG. 1.

Figure 5:
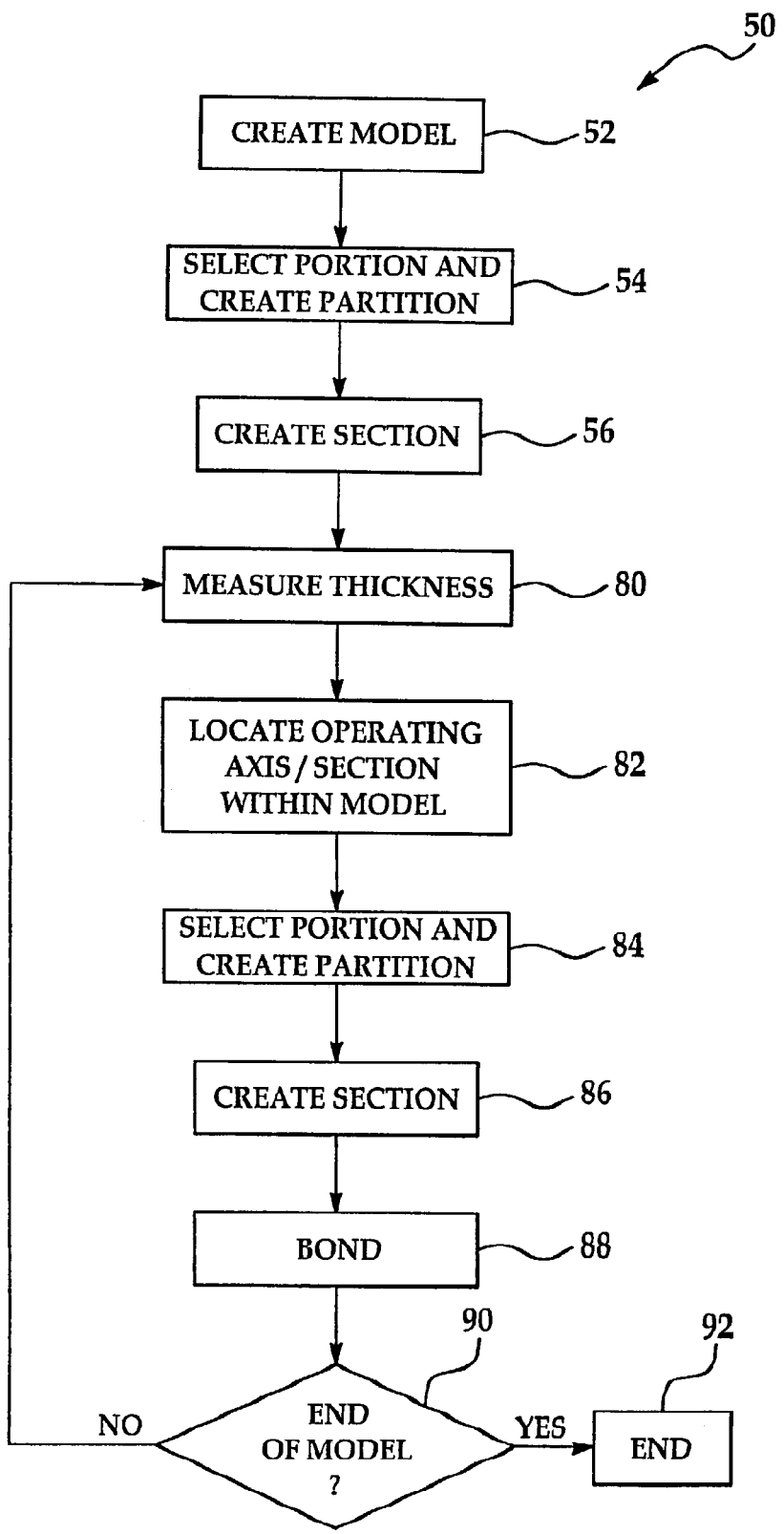
FIG. 5 is a flowchart including a sequence of operational steps performed by the apparatus which is shown in FIG. 2 and cooperatively forming the tool forming methodology of the preferred embodiment of the invention.

It should be appreciated that while the following discussion utilizes the tool 40 which is shown in FIG. 1, nothing in this Application is meant to nor should limit the applicability of the apparatus 10 and/or the method of the invention to only a tool which is substantially similar to tool 40. Rather, the apparatus 10 and the tool forming methodology of the preferred embodiment of the invention may be used to selectively and rapidly and accurately construct a wide variety of dissimilar tools and objects. Reference is now made to methodology or flowchart 50, shown in FIG. 5, which comprises the tool creation methodology of the preferred embodiment of the invention and which is used by the tool forming apparatus 10.

Methodology 50 begins with a first step 52 in which a multi-dimensional mathematical and/or computer model of a tool is created. Particularly, the model, as known to those in the art, seeks to intangibly replicate a tool, such as tool 40. The model may be selectively created by the model creator and processor 12 or created by another apparatus (not shown), such as a conventional computer aided design or "CAD" apparatus, and communicated to or "exported to" the model creator and processor 12. The model may "look like" and be substantially similar in appearance to the structure which is depicted within FIG. 1. Step 54 follows step 52 and, in this step 54, a portion of the model is selected and this portion defines a partition (e.g., a "partition" is a cross sectional portion of the model). That is, in one non-limiting embodiment of the invention, the user of apparatus 10 and/or the model creator and processor 12 selects ("replicates") one of the ends of the model of tool 40 which corresponds to one of the ends 46, 48, and then sequentially creates unique partitions of the model in a direction toward the other "unselected" end 46, 48 until the entire model has been traversed. Each partition, such as the initial partition 51, therefore corresponds to a unique cross sectional area of the tool 40. Moreover, the user of apparatus 10 (or the processor 12) specifies a predetermined thickness 49 for each such partition. Step 56 follows step 54 and, in this step 56, a physical section is created which is based upon and represents the physical manifestation of the first designated and/or defined model partition 51.

In step 56, material having a thickness 49 is provided by the provider 16 and transported to the laser cutter 14 in order to allow the specified and/or designed section to be physically created. That is, model creator and processor 12 creates a cutting program to cause the laser cutter 14 to form the provided material into the shape of this first defined partition 51, including slot 55 and air and/or cooling passages 57. The material may comprise steel or some other desired material.

Particularly, edges 58, 60 of the tool partition 51 respectively correspond to, (e.g., are used to construct in the following manner), in this example, edges 62 and 64 of section 66. Each edge 62, 64 is made to have a substantially identical height or "z-direction value" equal. That is, various points 70 are defined by the model creator and processor 12 along the edge 60. Similarly, various points 72 are defined along the edge 58. Each point 72 uniquely corresponds with or to (e.g., is substantially co-linear to) one of the points 70. The height or the "z-dimension" value for each pair of corresponding points 70, 72 is compared and the point 70, 72 having the lowest height is "modified" by having its height increased to equal the height of the other point 70, 72. In this manner, each pair of corresponding points 70, 72 has a substantially identical height which is equal to the largest height associated with or provided by the points 70, 72, and these modified points 70, 72 cooperatively define modified edges 58, 60. In one non-limiting embodiment, there is substantially no space between points 70 and substantially no space between points 72. The points 70, 72 are then respectively used to define the height of edges 64, 62. That is, the two modified edges 58, 60 (e.g., the modified points 70, 72) are overlayed to form a two dimensional edge and edges 64, 62 are made to be substantially similar to this two dimensional edge. In some alternate embodiment, the foregoing procedure is modified by causing the opposing edges 62, 64, at each pair of corresponding points 72, 70, to have a height which is substantially identical to the greatest height of any surface or portion of the model which resides between these pairs of corresponding points. That is, each pair of corresponding points 70, 72 is made to have a substantially identical height which is equal to the greatest height of any surface which resides between them and is co-linear to them. This alternative procedure is used when partitions of relatively large widths are used. In yet another non-limiting embodiment, each pair of corresponding points 70, 72 is made to have a height which is the greatest of the height of any of the two corresponding points 70, 72 and any surface which is between and co-linear to them. These "modified" points 70, 72 then form, within processor 12, a two dimensional line which become the cutting path for the laser cutter 14. The foregoing "modification" allows for the inclusion of surface counters necessary to allow the formed tool to perform the desired function and yet allows the tool to be rapidly formed.

The laser cutter 14 then forms the provided material in the manner, thereby creating section 66 from the partition 51 (e.g., surface 68 may be typically formed by a subsequent operation which may be accomplished by a conventional machine). Step 80 then follows step 56 and, in this step 80, the thickness measurer 24 measures the thickness or "x direction value" of the formed section 66 and provides the measurement to the model creator and processor 12. Step 82 follows step 80 and, in this step 82, the model creator and processor 12 uses the thickness measurement value to determine the amount of the model which has been replicated. That is, the model creator and processor 12 compares and uses the measured "x" direction value to fix a location within the model with which to create a new cross sectional partition within (e.g., the apparatus 10 will not attempt to replicate an already existing portion of the model). In this manner, structural variances within the provided material as well as other variances associated with such items as the bonding material which may increase the thickness of the created structure may be accounted for (e.g., the processor 12 may dynamically become aware of the fact that a larger amount of the model has been physically created and dynamically adjust to this situation by moving the site of the next partition to be created). Hence, these thickness measurement signals comprise dynamic positive feedback signals which allow tools to be rapidly and accurately made. This procedure also allows for the use of sections with varying thicknesses (e.g., the processor and model creator 12 may dynamically adjust and specify substantially any thickness for the created partition and section), thereby reducing production cost, and provides a "quick" or timely warning of inaccuracies with the produced structure. The positive feedback signal, in one non-limiting embodiment, is provided after each section is made, thereby providing timely notification of undesired large variances between the thickness of the created structure and the amount of the model which may desired to be replicated by this structure.

Step 84 follows step 82 and, in this step 84, another partition of the model may be taken in substantially the same manner as was previously delineated. Step 86 follows step 84 and, in this step, a section is created for this partition in the previously delineated manner. The newly created section is transported to the press 20, by portion 18, and is bonded to the previously deposited section. Step 90 follows step 88 and, in this step, the model creator and processor 12 determines whether the model has been completed. If the model has not been completed, step 90 is followed by step 80 in which the thickness of the bonded section is measured. This "thickness" feedback allows the processor 12 to dynamically learn of the amount the model that has been constructed and to compare the measured value with the theoretical or intangible values contained within the processor 12. Such comparison may cause processor 12 to determine that the tool has been incorrectly made and allow the processor 12 to quickly warn the user and/or recommend other corrective actions. Partitions and sections are created and selectively bonded by the previously described steps 80, 82, 84, 86, and 88, to the then existing structure until the tool is made. The methodology 50 is ended at step 92.

It should be appreciated that the invention is not limited to the exact construction or method which has been illustrated and discussed above, but that various changes and modifications may be made without departing from the spirit and the scope of the invention as is more fully delineated in the following claims.

What is claimed is:

1. A method for creating a tool, said method comprising the steps of creating a model of the tool; creating a first partition of the model; forming a first section from said first partition, said first partition including a passageway; measuring said first section; using said measurement to create a second partition of the model; forming a second section from said partition; and attaching said second section to said first section only after said second section is completely formed, thereby forming said tool.

2. The method of claim 1 wherein said second section has a height which is dependent upon said first section.

3. The method of claim 1 wherein said second section has a width which is dependent upon said first section.

4. The method of claim 1 wherein said passageway comprises an indentation.

* * * * *